US009756236B2

United States Patent
Okawa

(10) Patent No.: US 9,756,236 B2
(45) Date of Patent: Sep. 5, 2017

(54) PHOTOGRAPHING APPARATUS AND CONTROL METHOD FOR PHOTOGRAPHING APPARATUS

(71) Applicant: Olympus Corporation, Shibuya-ku, Tokyo (JP)

(72) Inventor: Satoshi Okawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/986,937

(22) Filed: Jan. 4, 2016

(65) Prior Publication Data

US 2016/0205310 A1 Jul. 14, 2016

(30) Foreign Application Priority Data

Jan. 8, 2015 (JP) ................. 2015-002219

(51) Int. Cl.
*H04N 5/232* (2006.01)
*G02B 7/09* (2006.01)
*G02B 7/10* (2006.01)
*G03B 3/10* (2006.01)

(52) U.S. Cl.
CPC .......... *H04N 5/23212* (2013.01); *G02B 7/09* (2013.01); *G02B 7/102* (2013.01); *G03B 3/10* (2013.01); *H04N 5/23296* (2013.01)

(58) Field of Classification Search
CPC . G02B 7/09; G02B 7/102; G03B 3/10; H04N 5/23212; H04N 5/23296
See application file for complete search history.

(56) References Cited

U.S. PATENT DOCUMENTS

| 6,275,262 B1* | 8/2001 | Ito ...................... H04N 5/23212 348/345 |
| 2008/0193116 A1* | 8/2008 | Uenishi ............. H04N 5/23219 396/135 |
| 2009/0244325 A1* | 10/2009 | Honjo ................... G02B 7/102 348/231.99 |
| 2010/0128133 A1* | 5/2010 | Lee .................... H04N 5/23248 348/208.5 |

(Continued)

FOREIGN PATENT DOCUMENTS

JP 2008-092619 4/2008

*Primary Examiner* — Amy Hsu
(74) *Attorney, Agent, or Firm* — John C. Pokotylo; Straub & Pokotylo

(57) ABSTRACT

A photographing apparatus comprises a focus adjustment lens capable of movement in an optical axis direction, an operation member for designating a movement amount on movement direction of the focus adjustment lens as a result of being operated, an operation time detector for detecting operation time based on operation amount of the operating member, a target position calculation section for calculating target position that the focus adjustment lens is moved to, based on operation amount of the operating member, and a controller for changing the target position based on the operation time, and repeatedly executing control to move the focus adjustment lens to the target position, wherein the controller sets a movement velocity of the focus adjustment lens, at an estimated time for recommencing movement of the focus adjustment lens, so that the focus adjustment lens moves to the target position.

19 Claims, 12 Drawing Sheets

(56) References Cited

U.S. PATENT DOCUMENTS

| | | | | |
|---|---|---|---|---|
| 2011/0096421 A1* | 4/2011 | Hirata | ............ | F03G 7/065 |
| | | | | 359/823 |
| 2012/0236198 A1* | 9/2012 | Hamada | ............ | G02B 7/36 |
| | | | | 348/352 |
| 2013/0308038 A1* | 11/2013 | Miyajima | ............ | G02B 7/34 |
| | | | | 348/345 |
| 2014/0211323 A1* | 7/2014 | Sugiura | ............ | G03B 17/00 |
| | | | | 359/698 |
| 2014/0327813 A1* | 11/2014 | Imanishi | ............ | G03B 17/14 |
| | | | | 348/357 |
| 2015/0022130 A1* | 1/2015 | Yoshimuta | ............ | H02P 6/24 |
| | | | | 318/400.15 |

* cited by examiner

FIG. 5

| LABEL NAME | NAME |
|---|---|
| T_MF_D | INTERMITTENCE AVOIDANCE MF MONITORING INTERVAL TIME |
| V_MF_Max | INTERMITTENCE AVOIDANCE (MF) MAXIMUM VELOCITY |
| V_MF_Min | INTERMITTENCE AVOIDANCE (MF) MINIMUM VELOCITY |
| T_MF_Off1 | INTERMITTENCE AVOIDANCE (MF) TIMER OFFSET 1 |
| T_MF_Off2 | INTERMITTENCE AVOIDANCE (MF) TIMER OFFSET 2 |
| T_MF_Off3 | INTERMITTENCE AVOIDANCE (MF) TIMER OFFSET 3 |
| C_MF_Off1 | INTERMITTENCE AVOIDANCE (MF) COUNTER OFFSET 1 |
| C_MF_Off2 | INTERMITTENCE AVOIDANCE (MF) COUNTER OFFSET 2 |
| C_MF_Off3 | INTERMITTENCE AVOIDANCE (MF) COUNTER OFFSET 3 |

FIG. 9

| LABEL NAME | NAME |
|---|---|
| T_MF_D | INTERMITTENCE AVOIDANCE MONITORING INTERVAL TIME |
| V_MF_Max | INTERMITTENCE AVOIDANCE (MF) MAXIMUM VELOCITY |
| V_MF_Min | INTERMITTENCE AVOIDANCE (MF) MINIMUM VELOCITY |
| P_MF_Off1 | INTERMITTENCE AVOIDANCE (MF) POSITION OFFSET 1 |
| P_MF_Off2 | INTERMITTENCE AVOIDANCE (MF) POSITION OFFSET 2 |
| P_MF_Off3 | INTERMITTENCE AVOIDANCE (MF) POSITION OFFSET 3 |
| C_MF_Off1 | INTERMITTENCE AVOIDANCE (MF) COUNTER OFFSET 1 |
| C_MF_Off2 | INTERMITTENCE AVOIDANCE (MF) COUNTER OFFSET 2 |
| C_MF_Off3 | INTERMITTENCE AVOIDANCE (MF) COUNTER OFFSET 3 |

PHOTOGRAPHING APPARATUS AND CONTROL METHOD FOR PHOTOGRAPHING APPARATUS

Benefit is claimed, under 35 U.S.C. §119, to the filing date of prior Japanese Patent Application No. 2015-002219 filed on Jan. 8, 2015. This application is expressly incorporated herein by reference. The scope of the present invention is not limited to any requirements of the specific embodiments described in the application.

BACKGROUND OF THE INVENTION

1. Field of the Invention

The present invention relates to a photographing apparatus for performing drive control of position of a focus adjustment lens in an optical axis direction in accordance with user operation, and to a control method for photographing apparatus.

2. Description of the Related Art

A photographing apparatus in which a lens such as a focus adjustment lens or a zoom lens is electrically driven in response to user operation is conventionally known. With this type of photographing apparatus, if a zoom operation is carried out then a focus adjustment lens is subjected to drive control so as to maintain focus in accordance with change in focal length (this operation is called zoom tracking).

If a zoom tracking operation is carried out during movie recording, then excitation and demagnetization of a motor are repeatedly carried out due to intermittent drive of a focus adjustment lens, drive noise arises, and this drive noise is undesirably recorded. In order to solve this problem, Japanese patent laid open number 2008-092619 (hereafter referred to as patent publication 1) proposes raising drive current in a stepwise manner when carrying out excitation from a demagnetized state, and lowering excitation current in a stepwise manner when demagnetizing.

However, with the patent publication 1, although drive noise is lowered by controlling excitation current, since intermittent drive is carried out there is insufficient lowering of drive noise and vibration that occur mechanically.

SUMMARY OF THE INVENTION

An object of the present invention is to provide a photographing apparatus that can suppress drive noise and vibration arising due to intermittent drive, and a control method for a photographing apparatus.

A photographing apparatus of the present invention comprises: a focus adjustment lens, provided inside a lens barrel containing a photographing lens, that is capable of moving in an optical axis direction, an operation member for designating a movement amount and movement direction of the focus adjustment lens as a result of being operated, an operation time detection section for detecting operation amount of the operating member and detecting operation time based on the operation amount, a target position calculation section for calculating target position that the focus adjustment lens is moved to, based on operation amount of the operating member, and a controller for changing the target position based on the operation time, and repeatedly executing control to move the focus adjustment lens to the target position, wherein the controller sets a movement velocity of the focus adjustment lens, at an estimated time for recommencing movement of the focus adjustment lens, so that the focus adjustment lens moves to the target position.

A photographing apparatus of the present invention comprises: a focus adjustment lens, provided inside a lens barrel containing a photographing lens, that is capable of moving in an optical axis direction, a zoom lens provided inside the lens barrel, a zoom movement information generating section for generating movement information of the zoom lens such as zoom position and zoom operation time, a target position calculation section for calculating target position that the focus adjustment lens is moved to, based on the zoom position, and a controller for changing the target position based on the zoom operation time, and repeatedly executing control to move the focus adjustment lens to the target position, wherein the controller sets a movement velocity of the focus adjustment lens, at an estimated time for recommencing movement of the focus adjustment lens, so that the focus adjustment lens moves to the target position.

A photographing apparatus of the present invention comprises: a focus adjustment lens, provided inside a lens barrel containing a photographing lens, that is capable of moving in an optical axis direction, an operation member for designating position the focus adjustment lens is moved to as a result of being operated, an operation time detection section for detecting setting position of the operating member and detecting operation time based on amount of change of the setting position, a target position calculation section for calculating target position that the focus adjustment lens is moved to, based on setting position of the operating member, and a controller for changing the target position based on the operation time, and repeatedly executing control to move the focus adjustment lens to the target position, wherein the controller sets a movement velocity of the focus adjustment lens, at an estimated time for recommencing movement of the focus adjustment lens, so that the focus adjustment lens moves to the target position.

A control method for a photographing apparatus of the present invention, having a focus adjustment lens, provided inside a lens barrel containing a photographing lens, that is capable of moving in an optical axis direction, and an operation member for designating movement of the focus adjustment lens as a result of being operated, comprising a detection step of detecting operation position or operation amount of the operating member and detecting operation time of the operating member, a calculation step of calculating target position that the focus adjustment lens is moved to, based on operation position or the operation amount of the operating member, and a control step of changing the target position based on the operation time, and repeatedly executing control to move the focus adjustment lens to the target position, wherein the control step sets a movement velocity of the focus adjustment lens, at an estimated time for recommencing movement of the focus adjustment lens, so that the focus adjustment lens moves to the target position.

BRIEF DESCRIPTION OF THE DRAWINGS

FIG. 5 is a table showing intermittent drive parameters, for intermittent drive of the camera of the first embodiment of the present invention.

FIG. 9 is a table showing intermittent drive parameters, for intermittent drive of a camera of a second embodiment of the present invention.

DETAILED DESCRIPTION OF THE PREFERRED EMBODIMENTS

Figure 1:
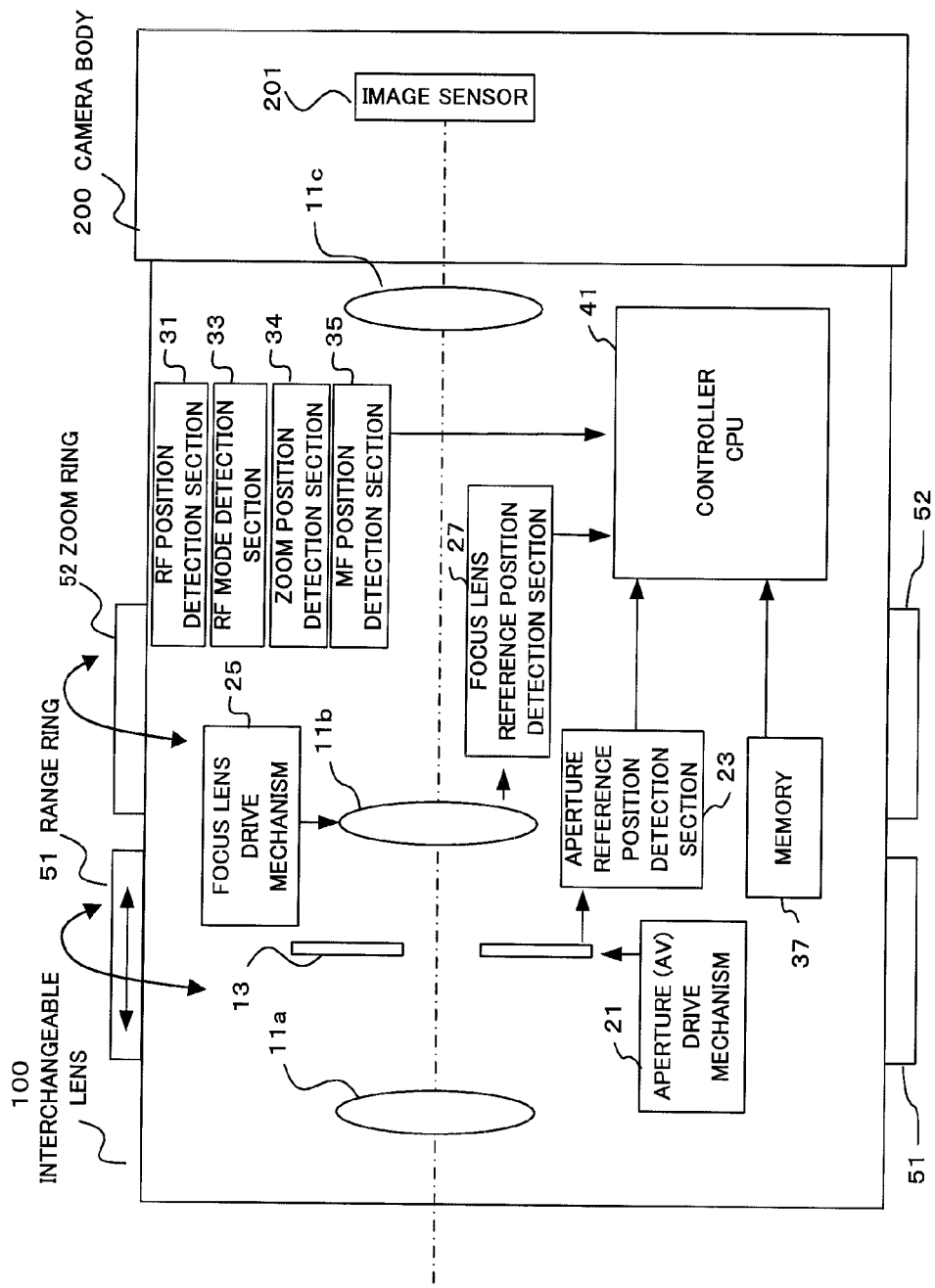
FIG. 1 is a block diagram showing the structure of a camera relating to a first embodiment of the present invention.
Figure 2:
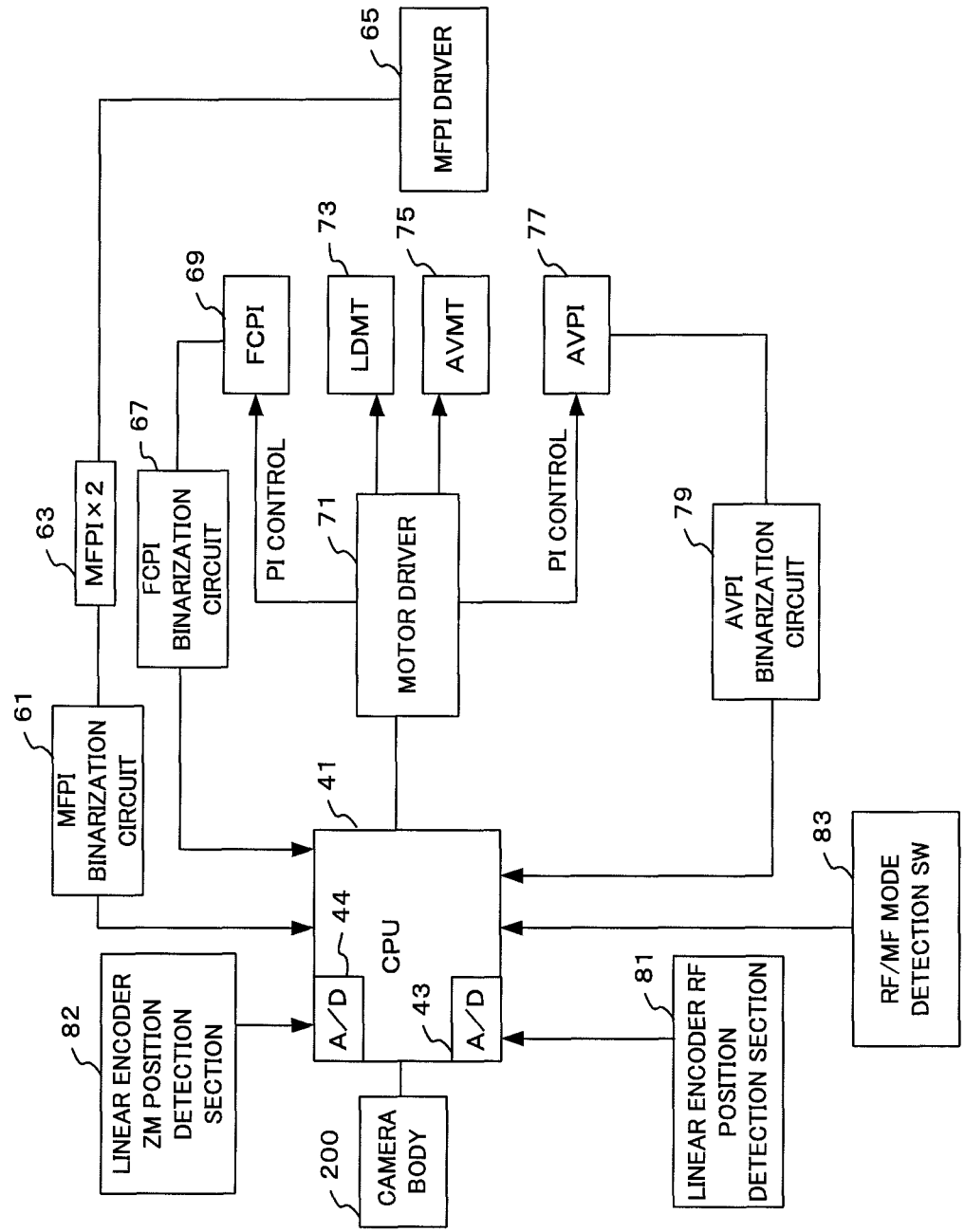
FIG. 2 is a block diagram mainly showing the electrical structure of a camera of a first embodiment of the present invention.

Preferred embodiments using a camera to which the present invention has been applied will be described in the following in accordance with the drawings. FIG. 1 is a block diagram showing the structure of a camera of a first embodiment of the present invention, and FIG. 2 is a block diagram showing the electrical structure of this camera. This camera comprises an interchangeable lens 100 and a camera body 200. It is also possible, however, for the lens barrel and the camera body to be integrally formed.

A photographing lens 11 made up of lenses 11a to 11c is provided within the interchangeable lens 100. A subject image is formed by the photographing lens 11. Within this lens 11, a focus lens 11b is a lens for focus adjustment, and is capable of being moved in the optical axis direction by a focus lens drive mechanism 25. The focus lens drive mechanism 25 has a focus lens actuator and a focus lens drive circuit. Also, some of the lenses 11a-11c are zoom lenses for varying focal length. Zoom lens groups are therefore provided inside the interchangeable lens 100.

Also, a focus lens reference position detection section 27 outputs a detection signal to a CPU 41, which is a controller, if the focus lens 11b reaches a reference position. A photo interrupter (PI) is used in reference position detection. With this embodiment, once the reference position has been detected, position detection of the focus lens 11b is carried out based on number of pulses (Pls number) applied to an actuator (using a pulse motor) for the focus lens with that position as a reference.

An aperture 13 is arranged between the lens 11a and the lens 11b. The aperture 13 has an opening diameter varied by an aperture drive mechanism 21, to vary an amount of subject light that passes through the photographing lens 11. The aperture drive mechanism 21 has an aperture actuator and an aperture drive circuit etc. A stepping motor is used as the actuator, and fine control is carried out using micro step drive. The aperture 13 may also be arranged at a position other than between the lens 11a and the lens 11b.

An aperture reference position detection section 23 outputs a detection signal to the CPU 41 if the aperture opening diameter reaches a reference position. A reference position for aperture position is acquired by the aperture reference position detection section 23, and aperture position is controlled by relative position detection. Relative position detection involves detection using a number of pulses applied to a stepping motor, while reference position detection involves detection using a photo interrupter (PI).

A range ring 51 is arranged around the outside of the interchangeable lens 100. The range ring 51 is capable of being turned around the outside of the interchangeable lens 100, and also slides within a specified range of the optical axis direction of the photographing lens 11. If this range ring 51 is slid towards the subject side it is set to a non-RF (non-range focus) (sometimes also referred to as MF (manual focus)) position, and is set to an RF (range focus) position if it is slid towards the body side.

Switching between RF mode and non-RF mode (MF mode) is carried out by sliding the range ring 51. Detection of this mode is carried out by an RF mode detection section 33. Also, the range ring 51 is constructed so as turn between a close-up end and the infinity end in RF mode, and to be rotatable without restriction in non-RF (MF) mode, as will be described later. This range ring 51 has a function as an operating member for designating movement amount and movement direction of the focus adjustment lens as a result of being operated, when MF mode has been set.

Non-RF mode is a mode for carrying out focusing in accordance with rotation direction and rotation amount of the range ring 51 by the user, while RF mode is a mode for focusing to a distance that has been designated using the range ring 51. Specifically, non-RF mode and RF mode are both manual focus, but with non-RF mode designation of a relative distance is carried out by the range ring 51, and differs from RF mode where an absolute distance is designated.

If non-RF (MF) mode is set by sliding the range ring 51, light shielding blades at an inner side of the range ring 51 rotate as one with rotation of the range ring 51. This movement of the light shielding blades is counted by the photo interrupter (PI), and the focus lens 11b is driven in accordance with this count value. Rotation direction and rotation amount of the range ring 51 may also be detected by a sensor other than a photo interrupter.

If RF mode has been set by sliding the range ring 51, then if the range ring 51 is rotated, that rotation position is detected by the RF position detection section 31. The RF position detection section 31 detects absolute position for rotation position of the range ring 51. The focus lens drive mechanism 25 drives the focus lens 11b to an imaging distance corresponding to the rotation position of the range ring 51, in accordance with control signals from the CPU 41. The range ring 51 functions as an operating member that is operated to designate position that the focus adjustment lens is moved to, if RF mode has been set.

The RF mode detection section 33 detects which of the non-RF position (MF position) or the RF position the range ring 51 has been set to, based on output of an RF/MF mode detection switch 83 (refer to FIG. 2).

An MF position detection section 35 detects rotation direction and rotation amount of the range ring 51, when the range ring 51 has been set to the non-RF position (MF position). The CPU 41 carries out manual focus control based on the detection result of this MF position detection section 35.

A zoom ring 52 is arranged around the outside of the interchangeable lens 100, more to the body side than the range ring 51, and is capable of being turned around the outside of the interchangeable lens 100. If the user manually rotates the zoom ring 52, zooming can be carried out.

A zoom position detection section 34 detects an absolute value for rotation position of the zoom ring 52, and outputs to the CPU 41. The zoom position detection section 34 has a linear encoder ZM position detection section 82, as will be described later. Output of this linear encoder position detection section 82 is subjected to A/D conversion by an A/D converter 44 within the CPU 41, and this A/D conversion value represents focal length. Zoom position of the zoom lens is known based on this A/D conversion value, and zoom velocity is determined based on change in this A/D conversion value over time. Accordingly, the zoom position detection section 34 and the CPU 41, which will we described later, function as a zoom movement information generating section for generating zoom position and zoom velocity relating to movement information of the zoom lens.

A memory 37 is a rewritable nonvolatile memory, such as flash memory 37 etc., and stores programs for the CPU 41, various information such as optical data of the interchangeable lens, various adjustment values, and various parameters etc.

In accordance with a program stored in the previously described memory 37, the CPU 41, which is a controller, carries out control within the interchangeable lens 100 in accordance with control instructions from the camera body 200. The CPU 41 is input with detection signals from the aperture reference position detection section 23, focus lens reference position detection section 27, the RF position detection section 31, the RF mode detection section 33, and the MF position detection section 35, and outputs control signals to the focus lens drive mechanism 25 and the aperture drive mechanism 21.

Figure 6:
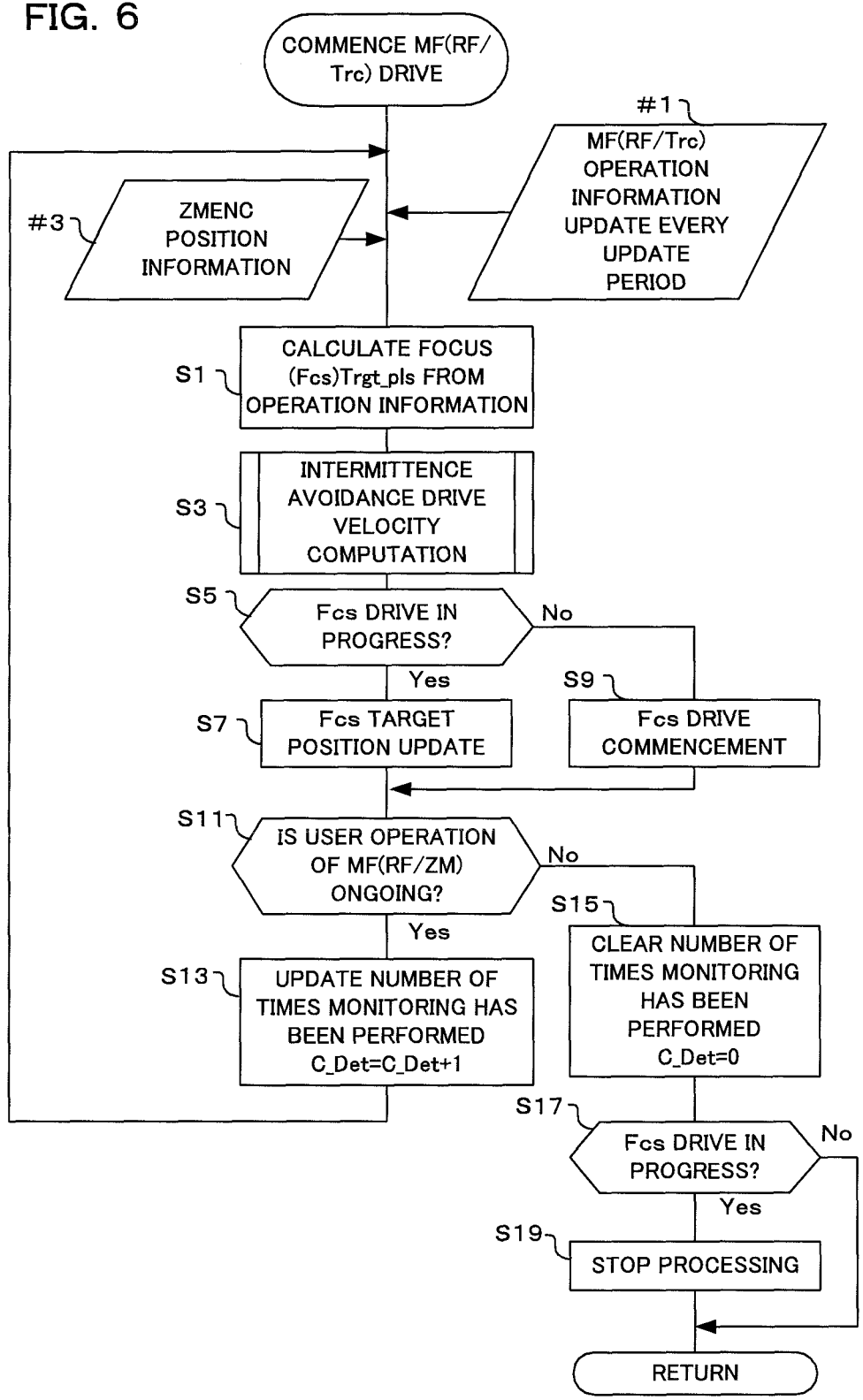
FIG. 6 is a flowchart showing operation of MF (RF/Trc) drive for the camera of the first embodiment of the present invention.

The CPU 41 functions as a target position calculation section for calculating target position that the focus adjustment lens is moved to, based on operation amount of the operating member (refer to S1 in FIG. 6). The CPU 41 also functions as a controller for changing target position based on operation time, and repeatedly executing control to move the focus adjustment lens to the target position (refer, for example, to FIG. 6). The CPU 41 also functions as a controller for setting movement velocity of the focus adjustment lens side so that at an estimated time when movement of the focus adjustment lens is recommenced, the focus adjustment lens is moved to the target position (refer, for example, to S3 in FIG. 6 and to FIG. 7A and FIG. 7B).

Figure 3A:
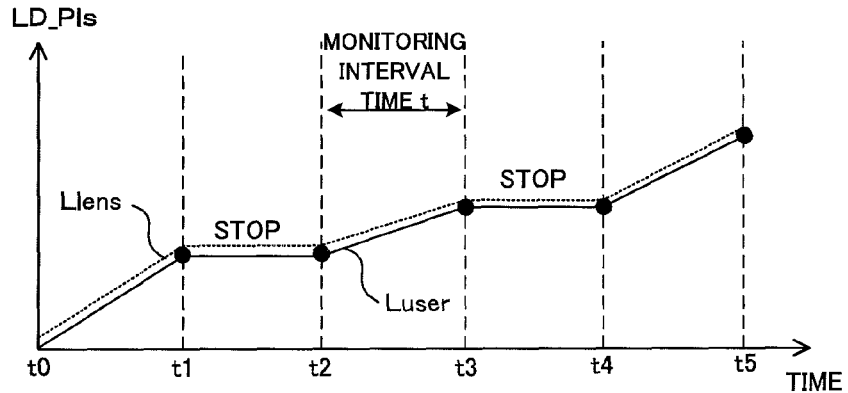
FIG. 3A and FIG. 3B are drawings for describing intermittent drive control, in the camera of the first embodiment of the present invention, with FIG. 3A being a graph showing conventional intermittent drive and FIG. 3B being a graph showing intermittent drive of this embodiment.
Figure 3B:
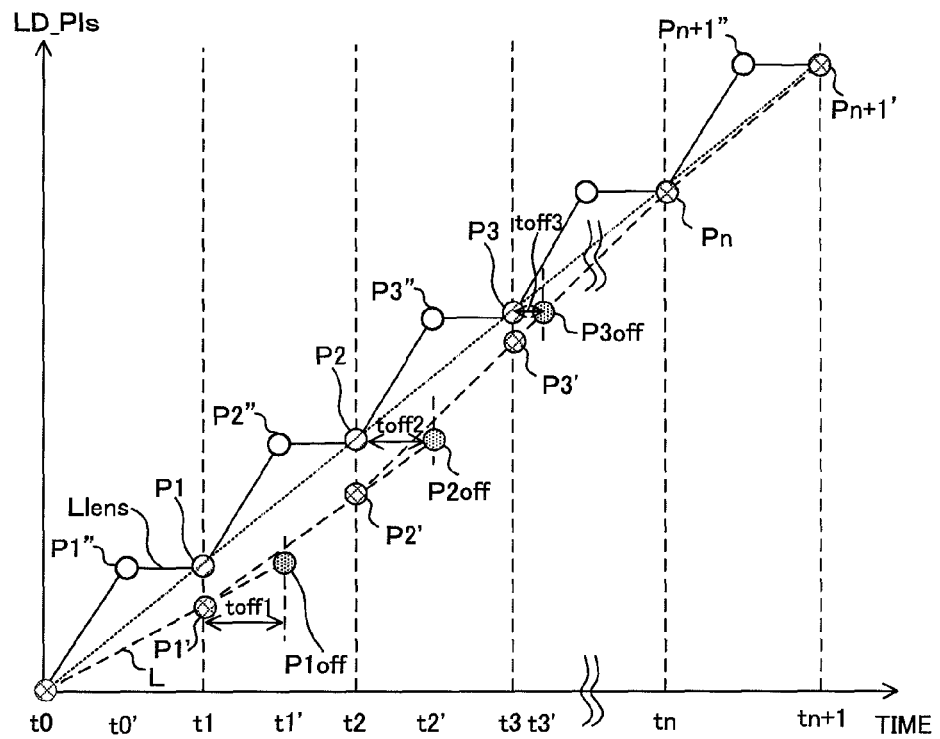
Figure 7A:
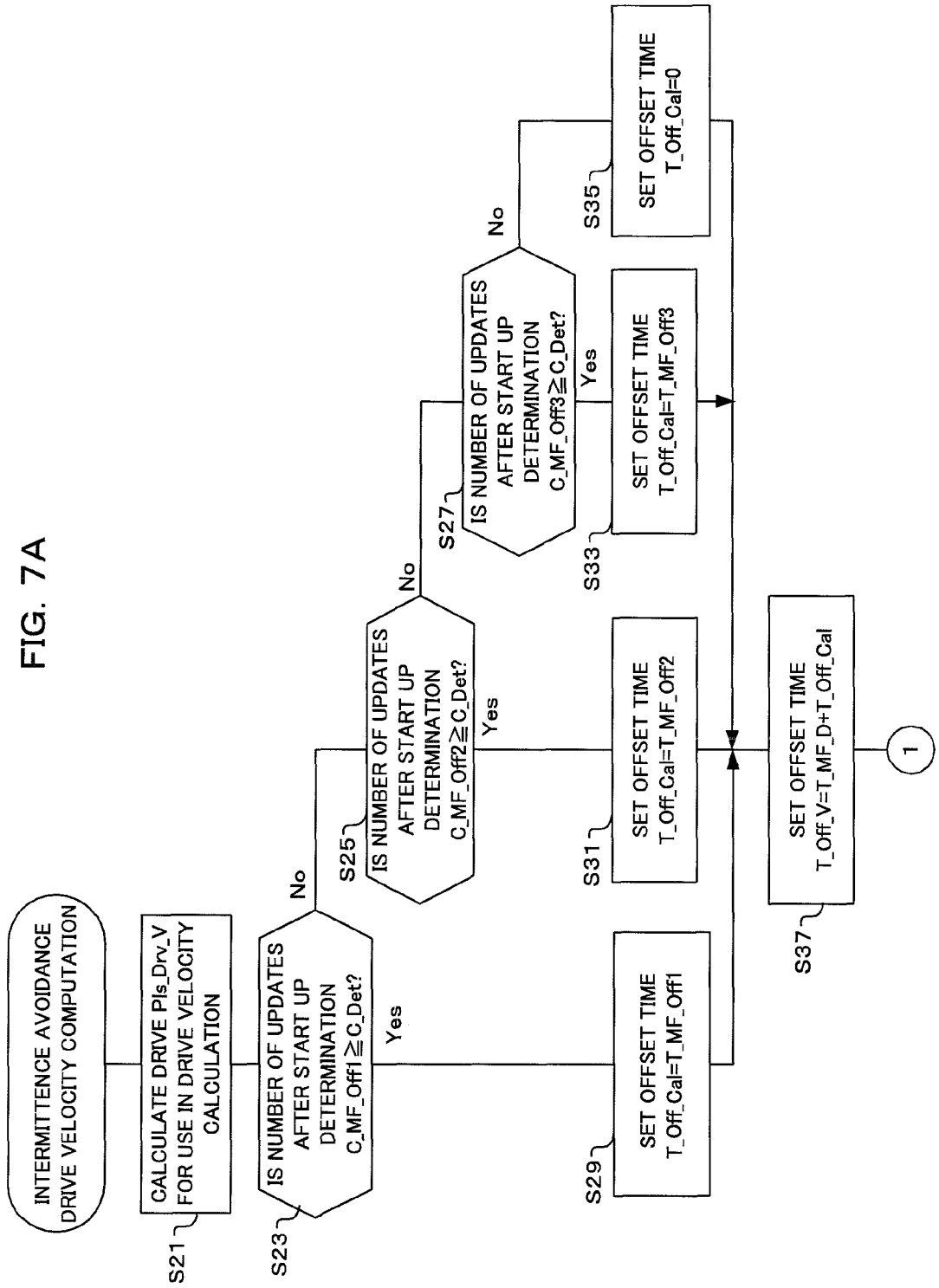
FIG. 7A and FIG. 7B are flowcharts showing operation for intermittence avoidance drive velocity computation for avoiding intermittent drive in the camera of the first embodiment of the present invention.

The CPU 41 functions as a controller for, when operation time is smaller than a specified threshold value, performing setting so that movement velocity of the focus adjustment lens is made smaller (refer, for example, to P1off-P3off in FIG. 3B, and S29-S39 in FIG. 7A). The CPU 41 functions as a controller for, when operation time is smaller than a specified threshold value, changing the target position so as to be closer (refer, for example, to P1off-P3off in FIG. 8, and S30-S40 in FIG. 10).

The CPU 41 functions as a target position calculation section for, at the time of zoom tracking, calculating target position that the focus adjustment lens is moved to, based on zoom position (refer, for example, to #3 and S1 in FIG. 6). The CPU 41 functions as a controller for changing target position based on zoom operation time, and repeatedly executing control to move the focus adjustment lens to the target position (refer, for example, to #3 and S1 in FIG. 6). The CPU 41 functions as a controller for setting movement velocity of the focus adjustment lens so that at an estimated time when movement of the focus adjustment lens is recommenced, the focus adjustment lens is moved to the target position (refer, for example, to S3 in FIG. 6 and to FIG. 7A and FIG. 7B).

The CPU 41, when RF mode is set, functions as a target position calculation section for calculating target position that the focus adjustment lens is moved to, based on setting position of the operating member (refer to #3 and S1 in FIG. 6). The CPU 41 functions as a controller for changing target position based on operation time, and repeatedly executing control to move the focus adjustment lens to the target position (refer, for example, to #3 and S1 in FIG. 6).

An image sensor 201 is arranged inside the camera body 200. This image sensor 201 is arranged close to an image forming position of the photographing lens 11, a subject image formed by the photographing lens 11 is subjected to photoelectric conversion, and image data is output. A control CPU is also provided inside the camera body 200, and carries our communication with the CPU 41 within the interchangeable lens 100.

Next, the detailed structure of electrical blocks will be described using FIG. 2. As described previously, the CPU 41 is capable of communication with the camera body 200. The CPU 41 is also connected to a motor driver 71, and this motor driver 71 carries out drive of an FCPI 69, LDMT 73, AVMT 75 and AVPI 77.

The FCPI 69 is a photo interrupter for reference position detection of the focus lens 11b, and output of this FCPI 69 is connected to an FCPI binarization circuit 67. The FCPI 69 and the FCPI binarization circuit 67 correspond to the previously described focus lens reference position detection section 27.

The LDMT 73 is an LD motor (lens drive motor), and functions as the previously described focus actuator within the focus lens drive mechanism 25. In this embodiment a VCM (Voice Coil Motor) is adopted as the LD motor, but it is also possible to use another motor such as a stepping motor, for example. The AVMT 75 is an aperture motor, and functions as the previously described aperture actuator within the aperture drive mechanism 21.

The AVPI 77 is a photo interrupter for reference position detection of the aperture 13, and output of this AVPI 77 is connected to an AVPI binarization circuit 79. The AVPI 77 and AVPI binarization circuit 79 correspond to the previously described aperture reference position detection section 23.

An MFPI driver 65 is a driver for the MFPI 63 for detecting turning of the range ring 51 in a case where the range ring 51 has been slid to the MF (non-RF) position. The MFPI 63 is provided at two locations along the turning direction of the light shielding blades. Output of this MFPI 63 is connected to an MFPI binarization circuit 61, and binarized by the MFPI binarization circuit 61. The MFPI binarization circuit 61, MFPI 63, and MFPI driver 65 correspond to the previously described MF position detection section 35. The MFPI 63, MFPI binarization circuit 61 etc. function as an operation time detection section for detecting operation amount of the operating member, and detecting operation time based on the operation amount.

A linear encoder RF position detection section 81 is a linear encoder for detecting absolute value in the rotation direction of the range ring 51, in a case where the range ring 51 has been slid to the RF position. The linear encoder RF position detection section 81 is provided along a turning direction of the range ring 51, and outputs an analog signal in accordance with absolute position of the range ring 51 in the turning direction. An A/D converter 43 is provided within the CPU 41, and converts analog signals from the linear encoder RF position detection section 81 to digital signals. A/D conversion values from the A/D converter 43 represent subject distance (absolute distance) that has been set by the user (sometimes referred to as RF linear encoder A/D). The linear encoder RF position detection section 81 and the CPU 41 fulfill a role as an operation time detector for detecting setting position of the operating member for detecting operation time based on change amount of setting position.

The linear encoder ZM position detection section 82 is an encoder for detecting absolute value for the zoom ring 52 in the rotation direction. The linear encoder ZM position detection section 82 is provided along the rotation direction of the zoom ring 52, and outputs an analog signal in accordance with an absolute position of the zoom ring 52 in the rotation direction. The A/D converter 44 is provided within the CPU 41, and converts analog signals from the linear encoder ZM position detection section 82 to digital signals. AD conversion values from the A/D converter 44 represent focal length (absolute distance) that has been set by the user.

An RF/MF mode detection switch (SW) 83 is a switch for detecting whether the range ring 51 has been set to the RF mode or set to the MF mode (non-RF mode). This RF/MF mode detection SW 83 detects position of the range ring 51 in the optical axis direction, and is turned on or off when RF mode is set or when MF mode is set, and this on-off state is output to the CPU 41.

Next, control for avoiding intermittent drive of this embodiment (hereafter referred to as intermittence avoidance control or intermittence avoidance drive) will be described. Descriptions will be respectively given for manual focus drive (abbreviated to MF drive), ranged focus drive (abbreviated to RF drive), and zoom tracking drive (abbreviated to Trc drive) at the time of a zoom operation (abbreviated to ZM operation).

Drive amount of the focus lens for changing movement amount for the same image plane will differ depending on zoom position. For example, in the case of zoom tracking drive, a tracking curve changes depending on the zoom position, and control pulse amount for the focus lens will change for the same image plane movement amount. Since a zoom (MR, RF) operation by the user is carried out arbitrarily, change in lens state is monitored every monitoring period, and focus lens drive is carried out in accordance with the user operation.

With a range focus operation (abbreviated to RF operation), the range ring 51 is at the RF mode position. Operation amount of the range ring 51 is detected by the linear encoder RF position detection section 81, while absolute position is detected by the A/D converter 43. The focal length that has been adjusted by the zoom ring 52 is detected by the linear encoder ZM position detection section 82, and zoom position (sometimes abbreviated to ZM position) is detected by the A/D converter 44. Target position for drive pulses of the focus lens (abbreviated to LD pulses) is calculated based on the absolute distance that has been set with an RF operation, and ZM position, and drive is carried out.

With a manual focus operation (abbreviated to MF operation), the range ring 51 is at the non-RF (MF) mode position. Light shielding blades that operate simultaneously with the range ring 51 move a transmissive/light shielded detection section of the MFPI 63 in accordance with a rotation operation of the range ring 51. The two MFPIs 63 are arranged so that respective phases for transmissive/light shielding are offset by 90 degrees, and a number of edges that have been input in a given time are counted by a two-phase counter. LD pulse target position of the focus lens is calculated from ZM position and input edge number, and drive is performed.

With zoom tracking (sometimes abbreviated to Trc), LD pulse amount corresponding to change in ZM position will be different depending on ZM position, even for the same image plane position (position at subject distance [m]). LD pulse amount that changes in accordance with ZM position is calculated in response to a zoom operation so as to focus at the same subject distance, and the focus lens is moved by driving the LD motor by the calculated LD pulse amount.

When carrying out an MF operation, RF operation, or zoom tracking at the time of a zoom operation, a user operation is tracked as rapidly as possible. However, in a case where the operation amount of the user operation is small, or when there is leeway in the drive capability of the LD motor (lens drive motor) 73, that is, when rapid drive is possible, there is a temporary stop when the target position is reached within a monitoring period. Then, if drive is recommenced in accordance with user operation in the next monitoring period, intermittent stopping and start-up of the LD motor will arise, and intermittent drive noise (hereafter referred to as intermittent noise) and intermittent vibration (hereafter referred to as intermittent vibration) will arise as a result of this intermittent operation.

This intermittent drive will be described using FIG. 3A. Time t between times t0, t1, t2, t3, t4, t5, . . . is a monitoring interval time. Also, black circles in FIG. 3A are LD pulse target positions in a monitoring interval time, and LD pulse target position is updated every monitoring interval time. Also, the line Luser represents user operation, while the line Llens represents positions of the focus lens moving towards an LD pulse target position that has been updated by tracking user operation.

With this example shown in FIG. 3A, it is a case where the user performs an operation slowly, and the focus lens tracks for every monitoring interval, so that during time t1-t2, and t3-t4, the focus lens is stopped, and the stopped state arises intermittently, resulting in intermittent operation. As described previously, intermittent noise and intermittent vibration are generated as a result of this intermittent operation. Also, in a case such as this where user operation velocity is slow, such as when carrying out fine adjustment of focus, operation time is short resulting in intermittent operation, and in a case where use operation velocity is fast, such as when carrying out coarse adjustment, there is a tendency for operation time to continue for a comparatively long time.

With this embodiment, the occurrence of intermittent noise and intermittent vibration is suppressed by carrying out intermittence avoidance drive so that intermittent drive does not occur. With intermittence avoidance drive, control is carried out to retard tracking so that a target pulse is not reached until after the monitoring period. Specifically, the occurrence of intermittent drive when an operation has been performed slowly is suppressed by changing an offset time for update count for every monitoring period in accordance with operation state.

That is, with a coarse adjustment operation where it is desired to move the image plane rapidly (movement of the focus lens), offset time is made small, and the focus lens is controlled to track well. On the other hand, with a fine adjustment operation where it is desired to carry out image plane movement slowly (movement of the focus lens), offset time is made large and intermittent drive is suppressed by retarding tracking performance. Controlling so that a target pulse is not reached and making tracking performance good is a tradeoff relationship, but with this embodiment the two can be balanced in accordance with the operating state. In order to avoid making an algorithm for intermittence avoidance drive complicated, operation so that target position is not reached is realized by means of controlling drive velocity of the LD motor.

The intermittence avoidance drive of this embodiment will be described using FIG. 3B. In this drawing, the curved line Llens represents drive position of the focus lens when intermittence avoidance drive is not carried out, while the curved line L represents drive position of the focus lens when intermittence avoidance drive has been carried out.

Intermittence avoidance drive is commenced at time t0. At this time t0, a drive target pulse position (LDPls) for time t1, which is after the monitoring interval time t, is P1. However, if drive is performed with P1 as the target position, P1" will be reached at time t0', and drive will be stopped in the period from time t0' to time t1, causing intermittent drive. Therefore, P1off, which is the same LD pulse as P1, is set as a target position at t1' which is after time t1 by an offset time toff1. Also, drive velocity of the LD motor at this time is set to V_MF_Pre, which is a velocity such that P1 is not reached at time t1 when only the monitoring interval time has elapsed.

Once time t1 arrives, the drive position of the focus lens reaches P1'. At this time, a drive target pulse position for time t2, which is after the next monitoring interval time t, is P2. At this time also, P2off, which is the same LD pulse as P2, is made target position at time t2' which is the offset time toff 2 after time t2, so that the position of target P2 is not reached. Also, drive velocity at this time is set to V_MF_Pre, which is a velocity such that P2 is not reached at in the monitoring interval time. Once time t2 arrives, then similarly to the case of time t1, control is carried out so that P3off is reached at time t3' which is after the offset time toff3.

Then, if a number of updates has exceeded a given number of times, there is then a switch to drive with high tracking performance. With the example shown in FIG. 3B, at time tn, target position Pn after the updated interval time is made target position as is, not a target position after an offset time.

Figure 4:
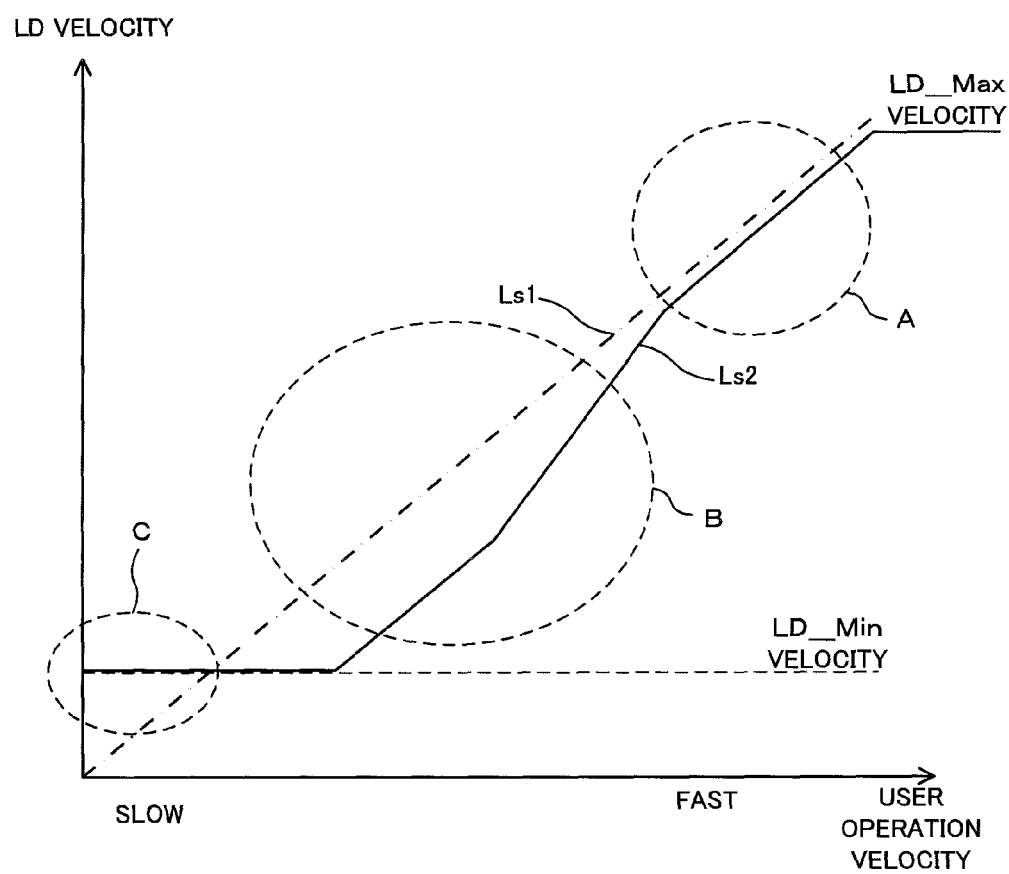
FIG. 4 is a graph showing a relationship user operation and Max velocity, for the camera of the first embodiment of the present invention.

In this way, with the intermittence avoidance drive of this embodiment, drive velocity is set such that an updated target position is reached after an offset time toff. A relationship between user operation and drive velocity will be described using FIG. 4. In FIG. 4, the vertical axis is drive velocity of the LD motor (LD velocity) at the time of driving the focus lens, and the horizontal axis is velocity of a user operation. The straight line Ls1 is LD motor (focus lens) drive velocity using a general control method for driving the focus lens proportionally to the user operation velocity, and the curved line Ls2 is LD motor drive velocity (LD velocity) for user operation velocity in a case where intermittence avoidance drive is carried out.

As shown in FIG. 4, in a case where intermittence avoidance drive is carried out, if user operation velocity is fast LD velocity is set such that a target pulse is reached without stopping (refer to region A in the drawing). Also, in a case where user operation is slow, a slow drive velocity is set so that intermittent drive is prevented from being entered as much as possible, more so than tracking performance (refer to region B in the drawing). In a case where user operation is less than or equal to a given velocity, drive is carried out with a given minimum velocity LD_Min set (refer to region C in the drawing). This is in order to avoid the target position never being reached.

Before describing operation of this embodiment using a flowchart, parameters for intermittence avoidance drive used when carrying out intermittence avoidance drive will be described using FIG. 5. Each of the parameters shown in FIG. 5 is stored in the memory 37. With FIG. 5, only parameters used at the time of MF operation will be described. The same parameters as for the MF operation are also set in respectively optimal data and used at the time of RF operation and zoom tracking operation. In this case, within label names of the parameters, tables in which "MF" portions have been replaced with "RF" or "Trc" are respectively prepared, tables with appropriate data are stored in the memory 37, and these tables are readout and used at the time of RF operation or zoom tracking operation.

The first entry "T_MF_D" in FIG. 5 represents MF monitoring interval time for intermittence avoidance. This parameter is monitoring interval time in MF mode etc., and corresponds to monitoring interval time t shown in FIG. 3A and FIG. 3B. The CPU 41 detects operation states of operation members (the range ring 51, and at the time of a zoom operation, the zoom ring 52) at this time interval, based on signals from the MFPI 63, linear encoder RF position detection section 81, linear encoder ZM position detection section 82 etc.

The monitoring interval time for intermittence avoidance is changed depending on the operation mode. With a tracking operation used in a zoom operation, there is designation of the monitoring interval time from the camera body 200 after completion of the tracking operation. In order to return to scan drive or focus drive for autofocus, in a case where it is desired to track as fast as possible, the monitoring interval time is shortened. Also, at the time of an MF operation, monitoring interval time is prolonged so that it is possible to detect coarse adjustment/fine adjustment user operations, by changing drive pulses in accordance with number of edges of the MFPI 63 that have been input within an update period.

The second entry "V_MF_Max" in FIG. 5 represents intermittence avoidance (MF) maximum velocity. This parameter is a value given as maximum velocity for drive velocity when carrying out intermittence avoidance drive, in FIG. 3B (corresponding to gradient of a line in this drawing). This maximum velocity is set as LD_Max velocity, as shown in FIG. 4.

The third entry "V_MF_Min" in FIG. 5 represents intermittence avoidance (MF) minimum velocity. This parameter is minimum velocity when carrying out intermittence avoidance drive. Velocity at the time of carrying out intermittence avoidance drive varies depending on the user operation velocity, but even so, a minimum velocity is fixed, as shown by LD_Min in FIG. 4.

The 4th to 6th entries "T_MF_Off1"-"T_MF_Off3" in FIG. 5 FIG. 5 represent intermittence avoidance (MF) timer offsets (1)-(3). Also, the 7th to 9th entries "C_MF_Off1"-"C_MF_Off3" represent intermittence avoidance drive (MF) counter offsets (1)-(3). These entries are in a paired relationship, and if C_Det representing number of times update has been carried out (refer to steps S23-S27 in FIG. 7A, which will be described later) is less than C_MF_OffX (X is (1) to (3)), offset time is made T_MF_OffX (X is (1) to (3)) (refer to S29-S35 in FIG. 7A which will be described later).

Next, operation of intermittence avoidance drive of this embodiment will be described using the flowcharts shown in FIG. 6, FIG. 7A and FIG. 7B. These flowcharts are executed by the CPU 41 controlling each section within the interchangeable lens 100 in accordance with programs stored in the memory 37. It should be noted that these flowcharts show at the time of MF operation drive, but for RF operation at the time of an RF operation and zoom tracking operation at the time of a zoom operation the "MF" part within the parameter label name may be simply replaced with "RF" or "Trc", and so description of these operations in the flowcharts, and their associated descriptions, are omitted.

If an operating member (range ring 51 etc.) is operated, processing using the flow of FIG. 6 is commenced. With the flow of FIG. 6, information for the MF operation is updated every update period (#1). The update period is the entry MF monitoring interval time for intermittence avoidance T_MF_D in FIG. 5. This T_MF_D is read out from the memory 37, and at the time of MF operation, operating state of the range ring 51 is acquired from the MFPI 63 at this monitoring interval time, and the information is updated. At the time of RF operation, information appropriate to operation of the range ring 51 from the linear encoder RF position detection section 81 is updated at a monitoring interval time for RF.

Zoom position information (ZMENC position information) is also required (#3). Focal length information set using the zoom ring 52 is acquired from the linear encoder ZM position detection section 82 every previously described update period, and information is updated.

In #1 and #3, update of position information is carried out every update period. Specifically, if it is RF mode, an absolute position of an A/D value that has been acquired from the linear encoder RF position detection section 81 is updated as position information. Also, if it is MF mode, a number of edges that has been acquired from the two-phase MFPI 63 at the update time is updated as position information. Also, if it is at the time of a zoom operation, an absolute position of an A/D value that has been acquired from the linear encoder ZM position detection section 82 is updated as position information.

If operation for MF drive has commenced, a focus (Fcs) Trgt_pls is calculated from operation information (S1). Here, a drive amount (LD pulses) to a drive destination of the focus lens, namely a target position (focus Trgt_pls), is calculated based on operation information of an operating member (range ring 51 etc.) every update time. In the case of MF mode, target position is determined in accordance with rotation amount and rotation direction of the range ring 51. Also, when calculating target position, target position is determined in accordance with zoom position that was acquired in #3.

If focus Trgt_pls has been calculated in step S1, next intermittence avoidance drive velocity computation is carried out (S3). Here, drive velocity for avoiding intermittent drive when driving to the target position that was calculated in step S1 is determined. Detailed operation of this intermittence avoidance drive velocity computation will be described later using FIG. 7A and FIG. 7B.

If the intermittence avoidance drive velocity has been computed in step S3, it is next determined whether or not focus (Fcs) drive is in progress (S5). Focus drive is commenced as a result of step S9, which will be described later, but in this step it is determined whether or not the CPU 41 is carrying out focus drive of the focus lens using the LDMT 73 by means of the motor driver 71.

If the result of determination in step S5 is that focus drive is not in progress, focus drive is commenced (S9). Here, the CPU 41 commences drive control for the lens drive motor LDMT 73 by means of the motor driver 71. This drive control is carried out based on the focus Trgt_pls that was computed in step S1.

On the other hand, if the result of determination in step S5 is that focus drive is in progress, update to the focus target position is carried out (S7). Here, update of the target position is carried out based on the focus Trgt_pls that was computed in step S1.

Once focus drive has been commenced in step S9, or update to the focus target position has been carried out in step S7, it is next determined whether or not the MF operation by the user is continuing (S11). Here, whether or not the user is continuing with operation of the range ring 51 is determined based on a difference between information in a signal from the MFPI 63 that was acquired with the newest processing of #1, and information that was acquired by the previous processing of #1. If a difference between the newest information and previous information is smaller than a given threshold value, it is determined that operation has been stopped, while if the difference is greater than or equal to the given threshold value it is determined that the operation is ongoing. It should be noted that at the time of RF mode or a zoom operation, determination may be based on operation information of respectively corresponding operation members. Determination may also use focus Trgt_pls calculated based on operation information in step S1. For example, if the focus Trgt_pls is smaller than a given value it is determined that the operation has been stopped, while if focus Trgt_pls is greater than or equal to the given value it is determined that the operation is ongoing.

If the result of determination in step S11 is that the MF operation is ongoing, update to the number of times monitoring has been performed is carried out (S13). Here, 1 is added to a number of times monitoring has been performed C_Det. The value of number of times monitoring has been performed C_Det is reset in step S15 at the time of operation completion. Processing is carried out from step S1 every update period (every time the MF monitoring interval time for intermittence avoidance elapses). The number of times monitoring has been performed C_Det is therefore counted up every update period. Once number of times monitoring has been performed C_Det is updated, step S1 is returned to.

On the other hand, if the result of determination in step S11 is that the user is not continuing with the MF operation, clearing of the number of times monitoring has been performed is carried out (S15). Here, C_Det that counts the number of times monitoring has been performed is reset to 0.

Once clearing of the number of times monitoring has been performed has been carried out, it is next determined whether or not focus drive is in progress (S17). In this step, similarly to step S5, it is determined whether or not the CPU 41 is carrying out focus drive of the focus lens using the LDMT 73 by means of the motor driver 71.

If the result of determination in step S17 is that focus drive is in progress, stop processing is carried out (S19). Since the result of determination in step S11 is that the MF operation has stopped, stopping of the focus drive is carried out. Specifically, the CPU 41 stops focus drive of the focus lens by the LDMT 73.

Once drive of the focus lens has been stopped in step S19, if the result of determination in step S17 is that focus drive is not in progress the flow for the MF drive is terminated.

Next, detailed operation of the intermittence avoidance drive velocity computation in step S3 will be described using the flowcharts shown in FIG. 7a and FIG. 7B.

If the flow for intermittence avoidance drive velocity computation is entered, first drive Pls_Drv_V for drive velocity computation is calculated (S21). Here, relative drive Pls for the target position, namely a difference between target position (Trgt_pls) and current position (Now_pls) is computed at an update time. Accordingly, drive Pls_Drv_V is calculated from the following equation (1).

$$Pls\_Drv\_V = Trgt\_pls - Now\_pls \quad (1)$$

When the sign of a computation result of this drive Pls_Drv_V is negative, it means that there has been an update to a reverse target position.

If the drive Pls_Drv_V for drive velocity computation has been computed in step S21, next, in steps S23 to S27, a number of times of update C_Det after start-up determination and intermittence avoidance MF counter offsets 1-3 are compared, and an appropriate number of times of monitoring update is selected. Here, the number of times of update C_Det after start-up determination was counted in step S13. Also, the intermittence avoidance MF counter offsets 1-3 (refer to FIG. 5) are stored in the memory 37, and so these are read out and used.

First, it is determined whether or not the intermittence avoidance MF counter offset 1 (C_MF_Off1) is larger than the number of times of update C_Det after start-up determination (S23). If the result of this determination is No, it is next determined whether or not the intermittence avoidance MF counter offset 2 (C_MF_Off2) is larger than the number of times of update C_Det after start-up determination (S25). If the result of this determination is No, it is next determined whether or not the intermittence avoidance MF counter offset 3 (C_MF_Off3) is larger than the number of times of update C_Det after start-up determination (S27). There is a size relationship of C_MF_Off1<C_MF_Off2<C_MF_Off3.

On the other hand, if the result of determination in step S23 is Yes, then T_MF_Off1 is set as offset time for calculation T_Off_Cal (S29). This offset time T_MF_Off1 is stored in the memory 37, as shown in FIG. 5, and so this value is read out and set Also, if the result of determination in step S25 is Yes, then T_MF_Off2 is set as offset time for calculation T_Off_Cal (S31). This offset time T_MF_Off2 is stored in the memory 37, as shown in FIG. 5, and so this value is read out and set Also, if the result of determination in step S27 is Yes, then T_MF_Off3 is set as offset time for calculation T_Off_Cal (S33). This offset time T_MF_Off3 is stored in the memory 37, as shown in FIG. 5, and so this value is read out and set Also, if the result of determination in step S27 is No, then 0 is set as offset time for calculation T_Off_Cal (S35). In this case, offset time is 0, and intermittence avoidance control is not executed.

If setting of offset time for calculation T_Off_Cal has been carried out in steps S29 to S35, next setting of offset time for velocity control T_Off_V is set (S37). The offset time for velocity control T_Off_V is update time T_MF_D carried out in #1, and is calculated by adding the MF monitoring interval time for intermittence avoidance T_MF_D that is stored in the memory 37 to the offset time T_Off_Cal that was set in steps S29 to S35. Specifically, T_Off_V is calculated from equation (2) below.

$$T\_Off\_V = T\_MF\_D + T\_Off\_Cal \quad (2)$$

If the offset time for velocity control has been set in step S37, next MF velocity, specifically focus lens drive velocity V_MF_Prev appropriate for the MF operation, is calculated (S39). Here, a ratio of drive velocity Pls_Drv_V that was calculated in step S21 to offset time T_Off_V that was calculated in step S37 is obtained. Specifically, this ratio is calculated from equation (3) below.

$$V\_MF\_Prev = ABS|Pls\_Drv\_V/T\_Off\_V| \quad (3)$$

If the sign of a calculation result before obtaining an absolute value is negative, drive is performed in the reverse direction.

If MF velocity has been calculated in step S39, the drive velocity that was calculated in step S39 is compared with Max velocity and Min velocity stored in the memory 37 (refer to FIG. 4 and FIG. 5), and velocity is adjusted so that the calculated drive velocity is not slower than the Min velocity, without being faster than the Max velocity.

Typically, it is determined whether or not V_MF_Prev≥V_MF_Max (S41). Here, it is determined whether or not the drive velocity V_MF_Prev that was calculated in step S39 is larger than the intermittence avoidance MF maximum velocity V_MF_Max that is stored in the memory 37.

If the result of determination in step S41 is Yes, then drive velocity is rounded to the Max velocity (S45). Specifically, the drive velocity V_MF_Prev is made V_MF_Max.

On the other hand, if the result of determination in step S41 is No, it is next determined whether or not V_MF_Prev≥V_MF_Min (S43). Here, it is determined whether or not the drive velocity V_MF_Prev that was calculated in step S39 is smaller than the intermittence avoidance MF minimum velocity V_MF_Min that is stored in the memory 37.

If the result of determination in step S43 is Yes, then drive velocity is rounded to the Min velocity (S47). Specifically, the drive velocity V_MF_Prev is made V_MF_Min. On the other hand, if the determination in step S43 is No, then the drive velocity V_MF_Prev that was calculated in step S39 is used as is (S49).

If the drive velocity V_MF_Prev has been set in steps S45 to S49, then the flow for intermittence avoidance drive velocity computation is terminated and the originating flow is returned to.

Setting of the drive velocity V_MF_Prev that has been described above will be specifically described addressing FIG. 3B. In an interval from time t0 to t1, V_MF_Prev is represented by the following equation. First, t1−t0=T_MF_D, Pls_Drv_V=P1, and T_Off_Cal=toff1.

$$V\_MF\_Prev + P1/(T\_MF\_D + toff1) \quad (4)$$

In this way drive velocity V_MF_Prev is calculated so as to give target position P1' for time t1.

Similarly, in an interval from time t1 to t2, V_MF_Prev is represented by the following equation. First, t2−t1=T_MF_D, Pls_Drv_V=P2−P1', and T_Off_Cal=toff2.

$$V\_MF\_Prev = (P2 - P1')/T\_MF\_D + toff2) \quad (5)$$

In this way drive velocity V_MF_Prev is calculated so as to give target position P2' for time t2.

Figure 7B:
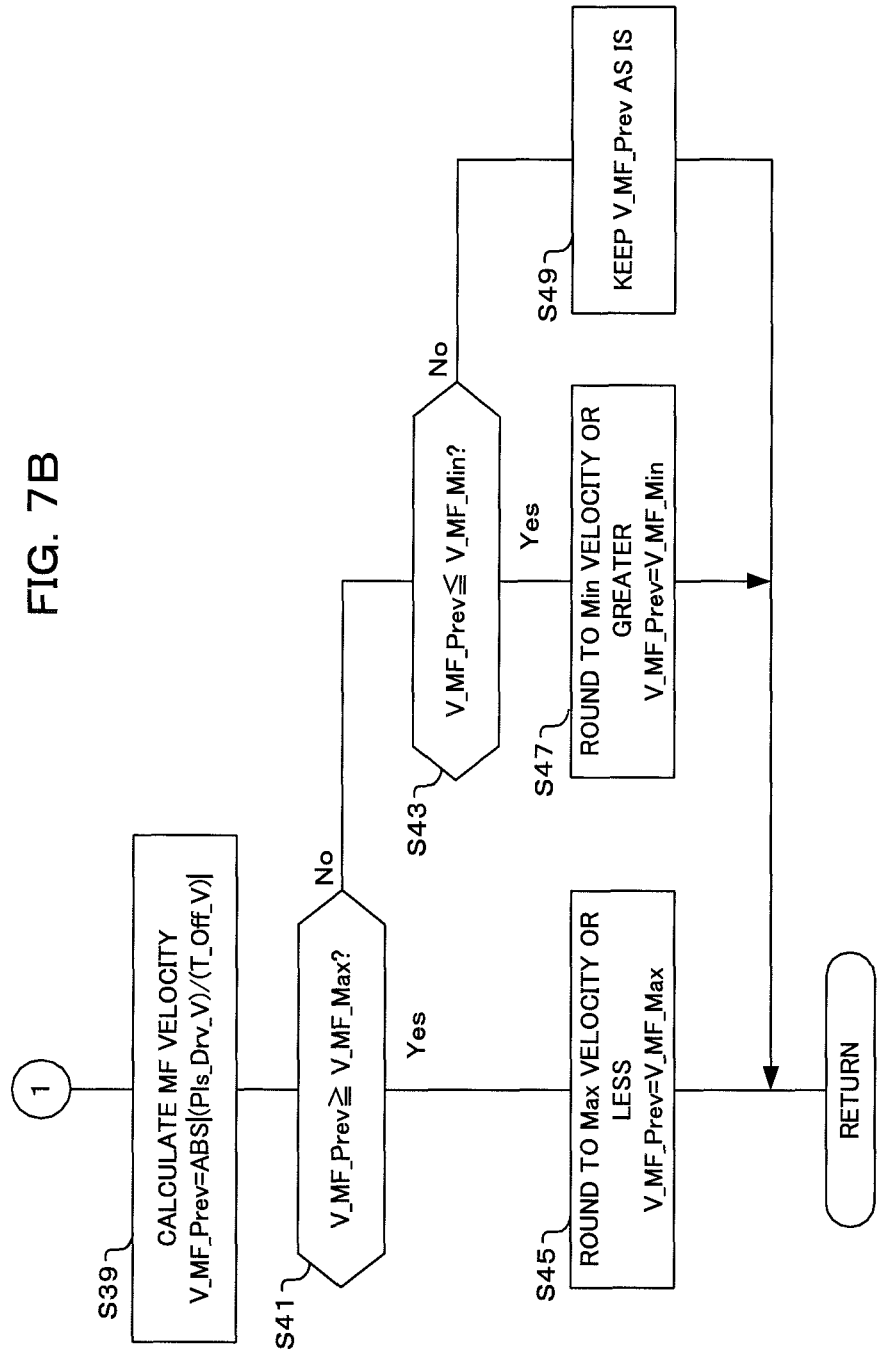

In the flowcharts of FIG. 6, FIG. 7A and FIG. 7B descriptions center on at the time of MF operation. However, this is not limiting, and it is also possible to carry out focus lens drive control based on zoom position and zoom operation time using the zoom ring 52 at the time of zoom tracking, and to carry out focus lens drive control based on setting position and operation time using the range ring 51 when RF mode has been set.

As has been described above, in the first embodiment of the present invention, at the time of MF mode, at an estimated time for recommencing movement of the focus adjustment lens, movement velocity of the focus adjustment lens is set so that the focus adjustment lens is moved to a target position. Also, at the time of zoom tracking, at an estimated time for recommencing movement of the focus adjustment lens, movement velocity of the focus adjustment lens is set so that the focus adjustment lens is moved to a target position. Also, at the time of RF mode, at an estimated time for recommencing movement of the focus adjustment lens, movement velocity of the focus adjustment lens is set so that the focus adjustment lens is moved to a target position. It is therefore possible to suppress drive noise and vibration that arise due to intermittent drive.

Also, it is possible to suppress drive noise and vibration by avoiding intermittent drive when operation velocity is slow (operation time is short), since intermittence avoidance drive control is stopped if the operation time exceeds a given value, without lowering tracking performance even in a case where operation time is fast (operation time is long).

Next, operation of a second embodiment of the present invention will be described. Description of sections that are the same as the first embodiment will be omitted, and description will be given for sections that are different.

With the first embodiment of the present invention, an intermittence avoidance counter offset value is changed and set in accordance with operation time of an operating member, target position at an estimated time for recommencing movement of the focus adjustment lens is changed based on the set intermittence avoidance counter offset value, and intermittence avoidance drive is carried out. The second embodiment differs from this in that a position offset amount corresponding to operation time of the operating member is provided, and target position at an estimated time for recommencing movement of the focus adjustment lens is set by being shifted by the position offset amount.

Figure 8:
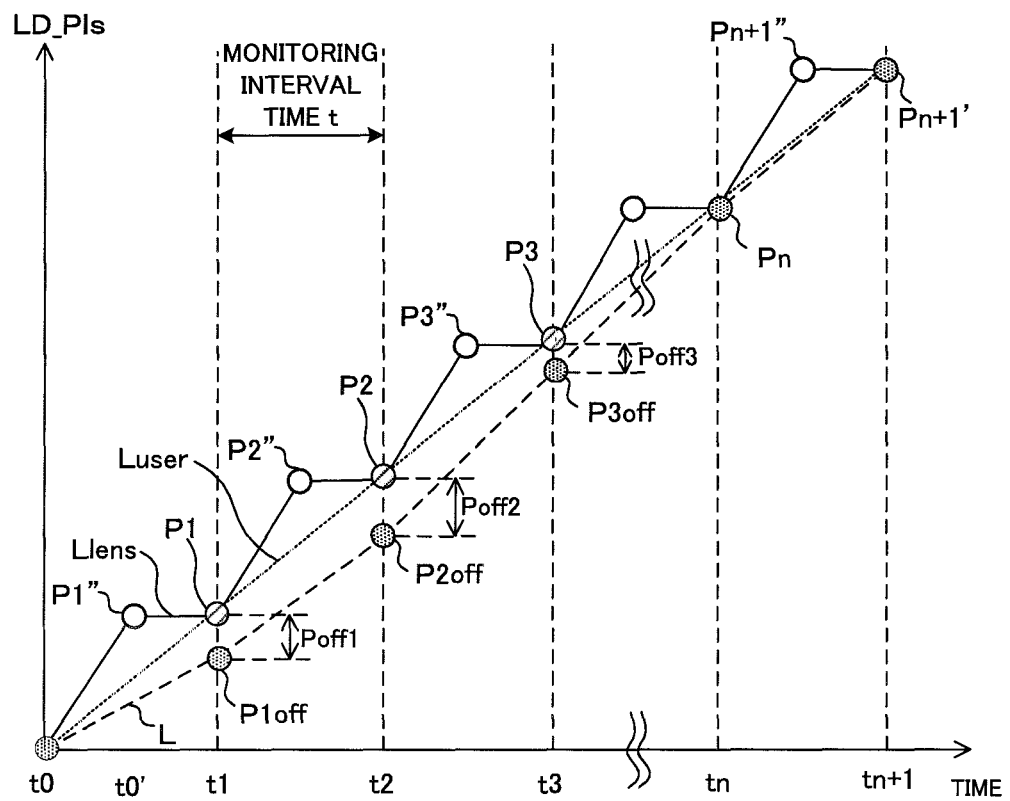
FIG. 8 is a drawing for describing intermittent drive control, in a camera of a second embodiment of the present invention, and is a graph showing intermittent drive.

FIG. 8 shows an overview of control, and has the same coordinate axis as FIG. 3B. In FIG. 8, the curved line Luser represents a drive curve of the focus lens when a user operation has been ideally tracked, the curved line Llens represents drive position of the focus lens when intermittence avoidance drive is not carried out, and the curved line L represents drive position of the focus lens when intermittence avoidance drive has been carried out.

Intermittence avoidance drive is commenced at time t0. At this time t0, a drive target pulse position (LD_Pls) for time t1, which is after the monitoring interval time t, is P1. However, if drive is performed with P1 as the target position, P1" will be reached at time t0', and drive will be stopped in the period from time t0' to time t1, causing intermittent drive. P1off that is derived by subtracting position offset amount Poff1 from the drive target pulse position P1 is then made the target position. Also, drive velocity of the LD motor at this time is set to V_MF_Pre, as a speed at which P1off will be reached at time t1 when only the monitoring interval time t has elapsed.

Once time t1 arrives, the drive position of the focus lens reaches P1off. At this time, a drive target pulse position for time t2, which is after the next monitoring interval time t, is P2. At this time also, P2off that is derived by subtracting position offset amount Poff2 from target position P2 is made the target position, so that target position P2 is not reached before time t2. Also, drive velocity at this time is set to V_MF_Pre, as a speed at which P2off will be reached at time t2 when only the monitoring interval time t has elapsed.

Once time t2 arrives, then similarly to the case for time t1, P3off that is derived by so attracting position offset amount Poff3 from target position P3 his made the target position, and control is carried out so that target position P0ff3 is reached at time t3.

Then, if a number of updates has exceeded a given number of times, tracking emphasized drive is switched to. With the example shown in FIG. 8, for target position Pn after updated interval time, that target position Pn is used as is without setting a target position that is derived by subtracting a position offset amount (or more specifically, with a position offset amount set of 0).

In this way, with the intermittence avoidance drive all this embodiment, target position Pmoff is set by subtracting position offset amount Poffm from a target position Pm Has been updated, and drive velocity is set so that the target position Pmoff is reached at an estimated time tm for recommencing drive of the focus lens.

Next, parameters for intermittence avoidance drive used when carrying out the intermittence avoidance drive obvious embodiment will be described using FIG. 9. Each of the parameters shown in FIG. 9 is stored in the memory 37 similarly to the parameters of FIG. 5. In FIG. 9, description has only been given for parameters that are used in MF operation, but similarly to FIG. 5, at the time of RF operation and zoom tracking operation also the same parameters as in FIG. 5 are set in respectively optimum data and used. The first to third entries, and the seventh to last entries, in FIG. 9 are the same as in FIG. 5, and description thereof is omitted. The 4th to 6th entries "P_MF_Off1"–"P_MF_Off3" in FIG. 9 represent intermittence avoidance (MF) position offset amounts (1)-(3).

Next, MF drive (commencement) processing for the second embodiment of the present invention is the same as the flowchart for MF drive (commencement) shown in FIG. 6. The intermittence avoidance drive velocity computation executed in step S3 of FIG. 6 will be described in the following.

Operation of intermittence avoidance drive of the second embodiment of the present invention will be described using the flowcharts shown in FIG. 10A and FIG. 10B. These flowcharts are executed by the CPU 41 controlling each section within the interchangeable lens 100 in accordance with programs stored in the memory 37. It should be noted that these flowcharts show at the time of MF operation drive, but for RF operation at the time of an RF operation and zoom tracking operation at the time of a zoom operation the "MF" part within the parameter label name may be simply replaced with "RF" or "Trc", and so description of these operations in the flowcharts, and their associated descriptions, are omitted.

Figure 10A:
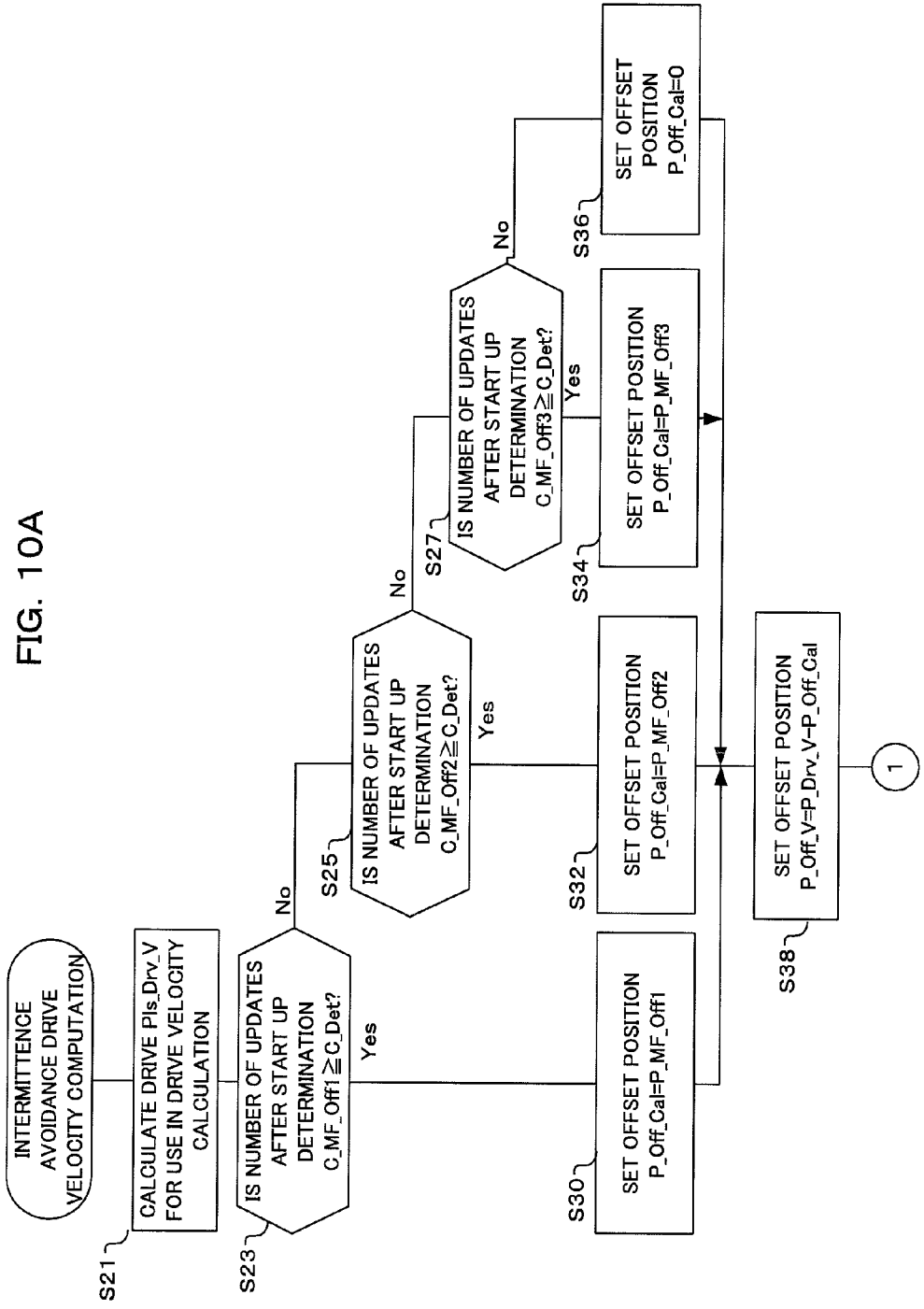
FIG. 10A and FIG. 10B are flowcharts showing operation for intermittence avoidance drive velocity computation for avoiding intermittent drive in the camera of the second embodiment of the present invention.

From step S21 to step S27 in FIG. 10A is the same as in FIG. 7A, and so description is omitted. If the result of determination in step S23 is Yes, then P_MF_Off1 is set as position offset amount for calculation P_Off_Cal (S30). This position offset amount P_MF_Off1 is stored in the memory 37, as shown in FIG. 9, and so this value is read out and set.

If the result of determination in step S25 is Yes, then P_MF_Off2 is set as position offset amount for calculation P_Off_Cal (S32). This position offset amount P_MF_Off2 is stored in the memory 37, as shown in FIG. 9, and so this value is read out and set.

If the result of determination in step S27 is Yes, then P_MF_Off3 is set as position offset amount for calculation P_Off_Cal (S34). This position offset amount P_MF_Off3 is stored in the memory 37, as shown in FIG. 9, and so this value is read out and set.

Also, if the result of determination in step S27 is No, then 0 is set as position offset amount for calculation P_Off_Cal (S36). In this case, position offset amount is 0, and intermittence avoidance control is not executed.

If setting of position offset amount for calculation P_Off_Cal has been carried out in steps S30 to S36, offset position for velocity control P_Off_V is set (S38). The offset position for velocity control P_Off_V is calculated by subtracting the position offset amount P_Off_Cal that was set in steps S29 to S35 from P_Drv_V that was calculated in step S21. Specifically, this offset position is calculated from equation (6) below.

$$P\_Off\_V = P\_Drv\_V - P\_Off\_Cal \qquad (6)$$

Figure 10B:
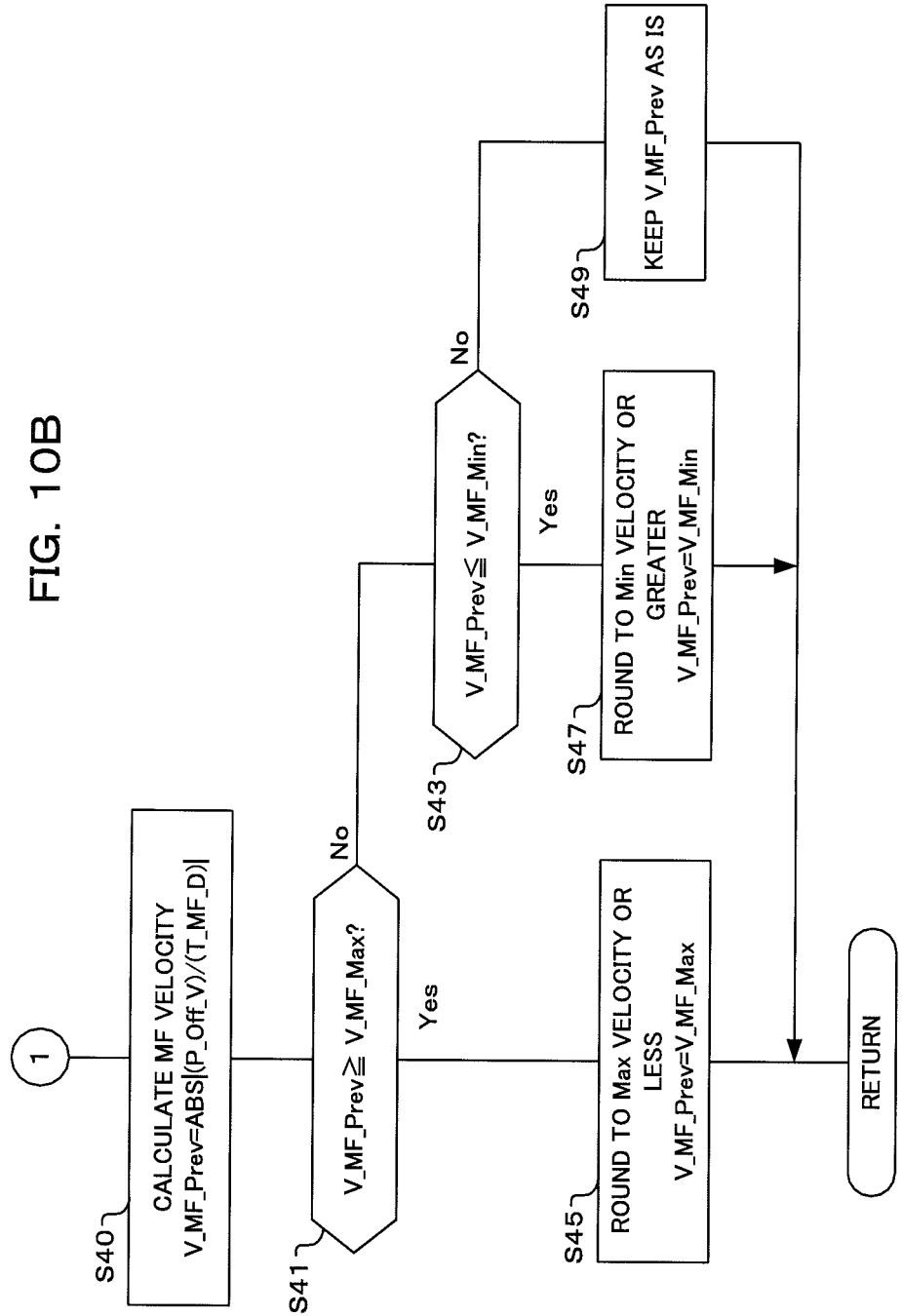

If the offset position for velocity control has been set in step S38, next MF velocity, specifically focus lens drive velocity V_MF_Prev appropriate for the MF operation, is calculated (S40 in FIG. 10B). Here, the drive velocity Pls_Drv_V that was calculated step S21 is divided by MF monitoring interval time for intermittence avoidance T_MF_D stored in the memory 37, which is updated time T_MF_D that was updated in #1, and an absolute value of the result is obtained. Specifically, this focus lens drive velocity is calculated from equation (7) below.

$$V\_MF\_Prev = ABS|Pls\_Drv\_V/T\_MF\_D| \qquad (7)$$

If the sign of a calculation result before obtaining an absolute value is negative, drive is performed in the reverse direction. Step S41 and onwards are the same as FIG. 7B, and so description is omitted.

As has been described above, in the second embodiment of the present invention, at the time of MF mode a position offset amount corresponding to operation time of an operating member is provided, a target position that is derived by subtracting the position offset amount from a target position at an estimated time for recommencing movement of the focus adjustment lens is set, and movement velocity of the focus adjustment lens is set at an estimated time for recommencing movement of the focus adjustment lens so that the focus adjustment lens is moved to the target position.

Also, with the second embodiment of the present invention, at the time of zoom tracking, at an estimated time for recommencing movement of the focus adjustment lens, movement velocity of the focus adjustment lens is set so that the focus adjustment lens is moved to a target position. Also, at the time of RF mode, at an estimated time for recommencing movement of the focus adjustment lens, movement velocity of the focus adjustment lens is set so that the focus adjustment lens is moved to a target position. It is therefore possible to suppress drive noise and vibration that arise due to intermittent drive.

As has been described above, the photographing apparatus over each of the embodiments of the present invention comprises a focus adjustment lens (for example the focus lens 11b), provided inside a lens barrel containing a photographing lens, that is capable of moving in an optical axis direction, and operation members for designating movement of the focus adjustment lens as a result of operation (for example, the range ring 51 and zoom ring 52). Also, this photographing apparatus executes a detection step (for example, #1 and #3 in FIG. 6) of detecting operation position or operation amount of the operating member and detecting operation time of the operating member, a calculation step (for example, S1 in FIG. 6) of calculating target position that the focus adjustment lens is moved to, based on operation position or operation amount of the operating member, and a control step (for example S3, S5, S7 etc. in FIG. 6) of changing the target position based on the operation time, and repeatedly executing control to move the focus adjustment lens to the target position. Also, this control step sets a movement velocity of the focus adjustment lens, at an estimated time for recommencing movement of the focus adjustment lens, so that the focus adjustment lens moves to the target position (refer, for example, to FIG. 3B, S3 in FIG. 6 and to FIG. 7A and FIG. 7B).

It should be noted that in each of the embodiments of the present invention, description has been given for an example where a voice coil motor has been used as the lens drive motor LDMT 73. However, this is not limiting, and another actuator may be used.

Further, with each of the embodiments of the present invention, an apparatus for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), personal computer (PC) tablet type computer, game console etc. In any event, the present invention may be applied to an apparatus as long as a focus adjustment lens is moved in accordance with operation of an operating member.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' unit,' 'component,' 'element,' 'module,' 'device,' 'member,' 'mechanism,' 'apparatus,' machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A photographing apparatus, comprising:
    a focus adjustment lens, provided inside a lens barrel containing a photographing lens, that is capable of moving in an optical axis direction,
    an operation member for designating a movement amount on movement direction of the focus adjustment lens as a result of being operated,
    an operation time detection section for detecting operation amount of the operating member and detecting operation time based on the operation amount,
    a target position calculation section for calculating target position that the focus adjustment lens is moved to, based on operation amount of the operating member, and a controller for changing the target position based on the operation time, and repeatedly executing control to move the focus adjustment lens to the target position, wherein the controller sets a movement velocity of the focus adjustment lens, at an estimated time for recommencing movement of the focus adjustment lens, so that the focus adjustment lens moves to the target position.

2. The photographing apparatus of claim 1, wherein:
the controller, in a case where the operation time is smaller than a given threshold value, set the movement velocity of the focus adjustment lens so as to be smaller.

3. The photographing apparatus of claim 1, wherein:
the controller, in a case where the operation time is smaller than a given threshold value, changes the target position so as to be closer.

4. A photographing apparatus, comprising:
a focus adjustment lens, provided inside a lens barrel containing a photographing lens, that is capable of moving in an optical axis direction,
a zoom lens provided inside the lens barrel,
a zoom movement information generating section for generating zoom position and zoom operation time relating to movement information of the zoom lens,
a target position calculation section for calculating target position that the focus adjustment lens is moved to, based on the zoom position, and
a controller for changing the target position based on the zoom operation time, and repeatedly executing control to move the focus adjustment lens to the target position, wherein
the controller sets a movement velocity of the focus adjustment lens, at an estimated time for recommencing movement of the focus adjustment lens, so that the focus adjustment lens moves to the target position.

5. The photographing apparatus of claim 4, wherein:
the controller, in a case where the zoom operation time is smaller than a given threshold value, sets the movement velocity of the focus adjustment lens so as to be smaller.

6. The photographing apparatus of claim 4, wherein:
the controller, in a case where the zoom operation time is smaller than a given threshold value, changes the target position so as to be closer.

7. A photographing apparatus, comprising:
a focus adjustment lens, provided inside a lens barrel containing a photographing lens, that is capable of moving in an optical axis direction,
an operation member for designating position the focus adjustment lens is moved to as a result of being operated,
an operation time detection section detecting setting position of the operating member and detecting operation time based on amount of change of the setting position,
a target position calculation section for calculating target position that the focus adjustment lens is moved to, based on setting position of the operating member, and
a controller for changing the target position based on the operation time, and repeatedly executing control to move the focus adjustment lens to the target position, wherein
the controller sets a movement velocity of the focus adjustment lens, at an estimated time for recommencing movement of the focus adjustment lens, so that the focus adjustment lens moves to the target position.

8. The photographing apparatus of claim 7, wherein:
the controller, in a case where the operation time is smaller than a given threshold value, sets the movement velocity of the focus adjustment lens so as to be smaller.

9. The photographing apparatus of claim 7, wherein:
the controller, in a case where the operation velocity is smaller than a given threshold value, changes the target position so as to be closer.

10. A control method for a photographing apparatus, having a focus adjustment lens, provided inside a lens barrel containing a photographing lens, that is capable of moving in an optical axis direction, and an operation member for designating movement of the focus adjustment lens as a result of being operated, comprising:
a detection step of detecting operation position or operation amount of the operating member and detecting operation time of the operating member,
a calculation step of calculating target position that the focus adjustment lens is moved to, based on operation position or the operation amount of the operating member, and
a control step of changing the target position based on the operation time, and repeatedly executing control to move the focus adjustment lens to the target position, wherein the control step sets a movement speed of the focus adjustment lens, at an estimated time for recommencing movement of the focus adjustment lens, so that the focus adjustment lens moves to the target position.

11. The control method for a photographing apparatus of claim 10, wherein:
the detection step detects operation amount of the operating member, and the text operation time based on the operation amount,
the calculation step calculates target position that the focus adjustment lens is moved to, based on operation amount of the operating member, and
the control step sets a movement velocity of the focus adjustment lens, at an estimated time for recommencing movement of the focus adjustment lens, so that the focus adjustment lens moves to the target position.

12. The control method for a photographing apparatus of claim 11, wherein:
the control step, in a case where the operation time is smaller than a given threshold value, sets the movement velocity of the focus adjustment lens so as to be smaller.

13. The control method for a photographing apparatus of claim 11, wherein:
the control step, in a case where the operation time is smaller than a given threshold value, changes the target position so as to be closer.

14. The control method for a photographing apparatus of claim 10, wherein:
the photographing apparatus further comprises a zoom lens, and
the detection step detects zoom position and zoom operation time relating to movement information of the zoom lens,
the calculation step calculates target position that the focus adjustment lens is moved to, based on the zoom position, and
the control step changes the target position based on the zoom operation time, and repeatedly executes control to move the focus adjustment lens to the target position.

15. The control method for a photographing apparatus of claim 14, wherein:

the control step, in a case where the zoom operation time is smaller than a given threshold value, sets the movement velocity of the focus adjustment lens so as to be smaller.

16. The control method for a photographing apparatus of claim 14, wherein:
the control step, in a case where the zoom operation time is smaller than a given threshold value, changes the target position so as to be closer.

17. The control method for a photographing apparatus of claim 10, wherein:
the detection step detects a setting position of the operating member and detects operation time based on amount of change of the setting position,
the calculation step calculates target position that the focus adjustment lens is moved to, based setting position of the operating member, and
the control step changes the target position based on the operation time, and repeatedly executes control to move the focus adjustment lens to the target position.

18. The control method for a photographing apparatus of claim 17, wherein:
the control step, in a case where the operation time is smaller than a given threshold value, sets the movement velocity of the focus adjustment lens so as to be smaller.

19. The control method for a photographing apparatus of claim 17, wherein:
the control step, in a case where the operation velocity is smaller than a given threshold value, changes the target position so as to be closer.

* * * * *